United States Patent [19]

Moessner

[11] Patent Number: 4,740,000

[45] Date of Patent: Apr. 26, 1988

[54] WIND-DRIVEN LAND VEHICLE

[76] Inventor: Eugen K. Moessner, Neudorfstrasse 3, D-7830 Emmendingen, Fed. Rep. of Germany

[21] Appl. No.: 8,248

[22] Filed: Jan. 29, 1987

Related U.S. Application Data

[63] Continuation-in-part of Ser. No. 736,884, May 22, 1985, abandoned.

[30] Foreign Application Priority Data

May 23, 1984 [DE] Fed. Rep. of Germany ....... 8415784

[51] Int. Cl.$^4$ ................................................ B62B 3/00
[52] U.S. Cl. ............................ 280/7.12; 280/87.04 A; 280/810
[58] Field of Search ......... 280/810, 87.04 R, 87.04 A, 280/11.27, 11.28, 11.1 BT, 1, 672, 675, 91, 7.12, 7.14, 24; 180/180, 181, 2.2, 7.1; 114/39

[56] References Cited

U.S. PATENT DOCUMENTS

| 887,812 | 5/1908 | Johnson | 280/87.04 A |
| 1,150,773 | 8/1915 | Chall | 280/87.04 A |
| 4,095,817 | 6/1978 | Cohen | 280/87.04 A |
| 4,200,302 | 4/1980 | de Rosnay | 280/1 |
| 4,448,441 | 5/1984 | Brummer | 280/675 |
| 4,466,372 | 8/1984 | Rudloff | 280/810 |
| 4,515,390 | 5/1985 | Greenberg | 280/675 |

FOREIGN PATENT DOCUMENTS

2438570 6/1980 France ................................. 280/810

Primary Examiner—John J. Love
Assistant Examiner—Richard Camby
Attorney, Agent, or Firm—Foley & Lardner, Schwartz, Jeffery, Schwaab, Mack, Blumenthal & Evans

[57] ABSTRACT

A wind-driven land vehicle with a board (10, 212) serving as a stand and a sail (14, 214) mounted on the board, is connected with front and rear running gears (20, 22, 216, 218) carrying wheels (68) or skids (90) in a manner such that the entire board or a steering member section (238) thereof is rotatable around its longitudinal center axis. The running gears each have a steering linkage coupled with the board (10) or the steering member section (238) which effects a simultaneous and opposite steering of the front and rear wheels or skids corresponding to a tilting movement of the board (10) or the steering member section (238) formed in the board.

20 Claims, 8 Drawing Sheets

WIND-DRIVEN LAND VEHICLE

This application is a continuation-in-part of my copending application Ser. No. 736,884, filed 5/22/85 now abandoned.

BACKGROUND OF THE INVENTION

The invention relates to a wind-driven land vehicle with a board serving as a stand and a sail attached thereto.

The present great popularity of wind surfing has led to attempts to use a sail of the type customarily used for wind surfing, which tilts and pivots in all directions, for land vehicles. However, the configurations known heretofore are unsatisfactory in regard to their manipulation and particularly their steering behavior. This also detrimentally affects the operating safety of the vehicle.

SUMMARY OF THE INVENTION

It is therefore the object of the invention to provide a land vehicle of the aforementioned type, having a high degree of operating safety and driving stability and that may be steered simply and optionally with narrow radii.

This object is attained according to the invention with a land vehicle of the aforementioned type by means of a steering linkage for simultaneously and oppositely steering front and rear wheels, skids or the like, said steering linkage being coupled with a rotating motion of a standing board or a steering member thereon around its longitudinal center axis.

The user standing on the board is therefore able to steer the front and rear wheels by a relatively slight rotation of the board or the steering member with his feet and thereby achieve relatively tight steering radii.

Preferably, front and rear, optionally identical, running gears are provided, each of which comprises a rigid, essentially box-shaped center frame upon which on both sides upper and lower transverse links, particularly wishbone links, are pivotably attached for mounting the wheels.

Tubular sections may be fastened to the front and rear ends of the board in the longitudinal center axis, supported rotatably in the center frame of the running gear. The steering linkage is preferably connected with the ends of the tubular sections protruding from the front and rear of the frame.

In accordance with another embodiment of the invention, the vehicle is constructed with a standing board in the form of a self-supporting hollow body of fiber reinforced synthetic resin or plastic material rigidly connected to the front and rear running gears which provides a secure stand for a rider. The steering is activated in this case with the aid of a steering member pivotably about its longitudinal axis and which is integrated into the standing board, for example by being disposed in a recess in the board, but which constitutes only a relatively small portion of the standing surface.

In this case at least one of the two transverse links for each support member is preferably constructed as a flat, horizontally oriented spring bar and rigidly attached to the vehicle structure.

With this construction of the running gear, the spring suspension takes place directly through the inherent elasticity of the transverse link, so that an additional spring can be omitted. By means of the rigid attachment of the spring bar to the vehicle structure, expensive linkages are avoided. Optionally, the spring bar can also be rigidly connected at its free end with a wheel support mount or the like. Since the wheel supports are always held in their original orientation by the transverse steering arms which function as a parallelogram linkage, there results in this case when the running gear is sprung in, an approximately S-form bending of the spring bar, which when sharp steering movement are executed, leads to a thoroughly desirable non-linear spring characteristic.

The spring bar may be comprised, for example, of glass fiber reinforced epoxy resin and therefore has only a relatively low weight. Nevertheless, because of its flat form and rigid attachment, the spring bar has a high longitudinal stability which is thoroughly comparable to the effect of a conventional triangular steering gear or trapezoidal steering gear.

Preferably both transverse links are formed as spring bars. A particularly simple construction is further achieved in that the upper and lower transverse links for the left and right wheels or skids are each integrally formed as a single continuous piece. The length of the freely projecting, and consequently spring acting, sections of the upper and lower spring bars are thereby somewhat different from each other, so that the spring bars have different characteristic frequencies or natural oscillation frequencies. The occurrence of resonant oscillations is hereby avoided, and a favorable oscillation damping is achieved, so that additional shock absorbers can be omitted. Furthermore, through suitable selection of the length of the transverse links, it can be achieved that the drop angle of the support members varies only slightly during spring loading and unloading, so that the support members are pivoted in substantially upright positions, and the track width remains unchanged.

Further details of the invention are set forth in the dependent claims.

BRIEF DESCRIPTION OF THE DRAWINGS

Preferred illustrative embodiments of the invention will be explained in detail hereinafter with reference to the attached drawings in which.

DETAILED DESCRIPTION OF PREFERRED EMBODIMENTS

Figure 1:
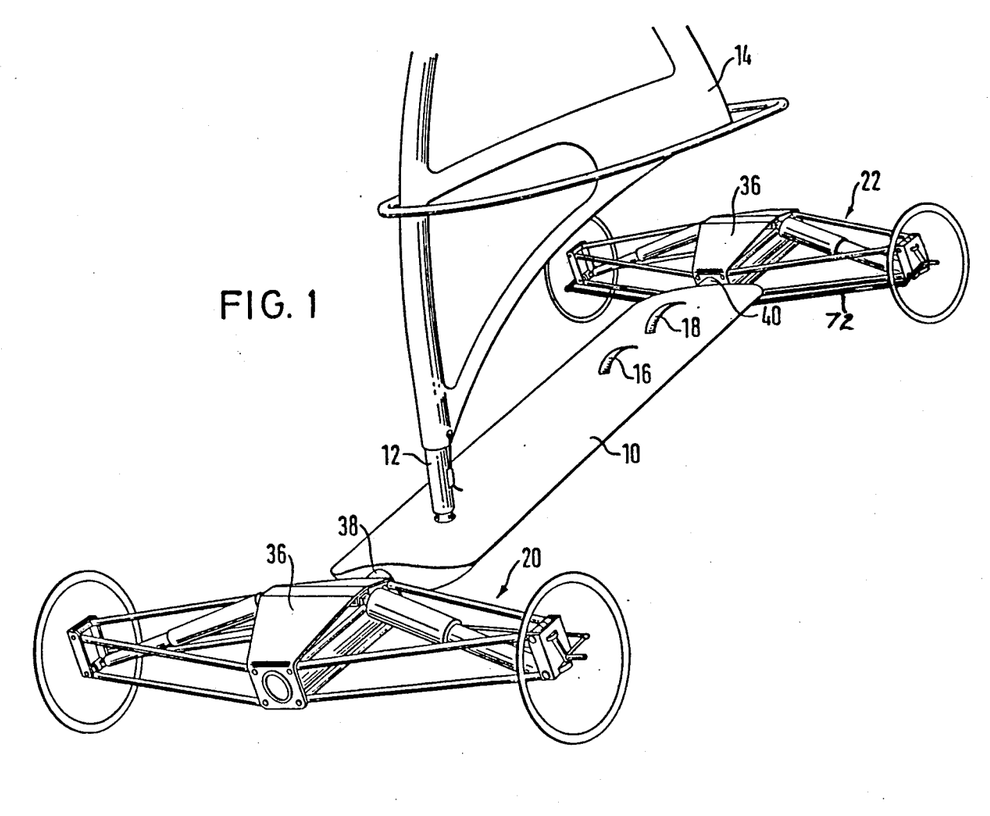
FIG. 1 is a perspective overall view of a land vehicle according to the invention.

FIG. 1 shows a land vehicle according to the invention with a board 10 having the configuration of a surfboard, a mast 12 and a sail 14. Details of the sail are not critical in this case. Two loops 16, 18 are further fastened to the board 10 into which a user can insert his feet.

The running gears 20, 22 are mounted on the front and rear ends of the board 10; in order to simplify their manufacture, they may be identical, so that hereafter only one running gear shall be described in detail.

Figure 2:
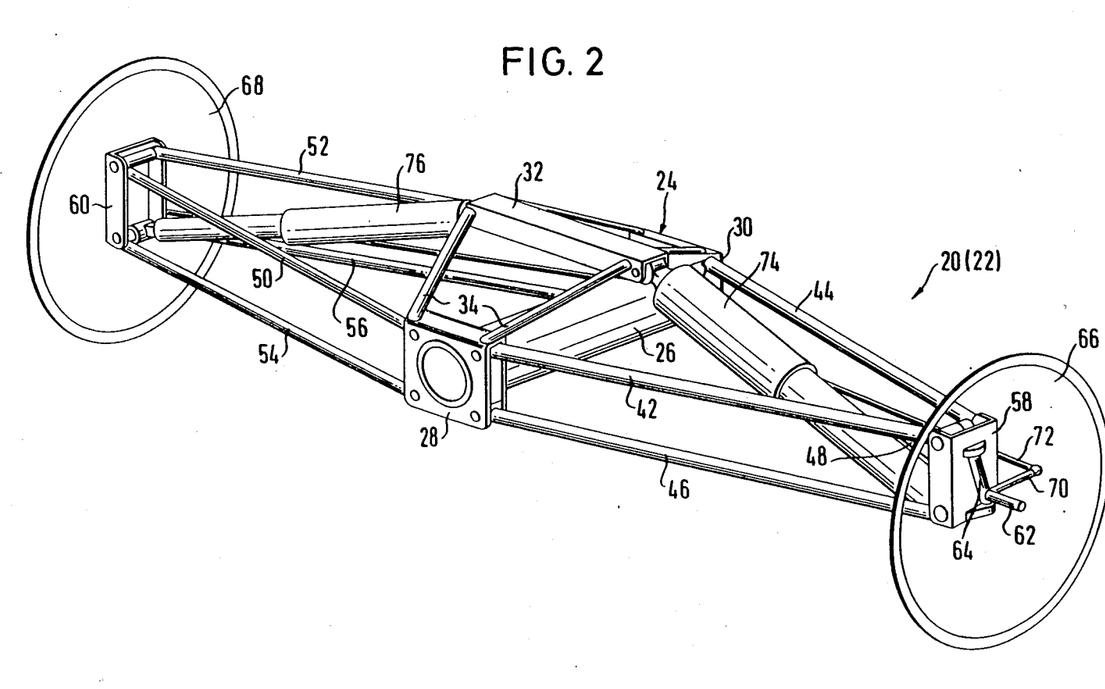
FIG. 2 is a view of a running gear.

According to FIG. 2, the running gears 20, 22 encompass in the center area a rigid frame 24 consisting of a tubular section 26, front and rear plates 28, 30 fastened to the ends of the tubular section 26, and an upper cross-strut, 32, which may be connected with the plates 28, 30 by means of inclined struts 34 according to FIG. 2 or plates 36 according to FIG. 1.

The tubular section 26 serves as a receiver and mounting bearing for the tubular sections 38, 40 fastened to the front and rear ends of the board in its longitudinal center axis. In the case of a board made of a synthetic plastic material a continuous tube may be molded in.

The upper and lower transverse links 42, 44, 46 48, 50, 52, 54, 56, which in pairs form triangle links are articulated onto the corners of the plates 28, 30 which are square in shape and are arranged in the form of spaced apart double plates. The outer ends of the triangle links are pivotably mounted in the manner known in automotive vehicles, in the upper and lower areas of wheel supports 58, 60, from which steering stub axles 62 protrude, which are fastened to pivotable, substantiallly vertical steering axle carriers 64. The sterring stub axles 62 carry the wheels 66, 68. A steering lever 70 and a steering rod 72 constitute parts of a basically conventional steering linkage.

The outer ends of the cross struts 32 of the running gears 20, 22 serve as the inner pivotable attachment point for shock absorbers 74, 76, the outer ends of which are pivotably supported on the lower area of the wheel bases 58.

Figure 3:
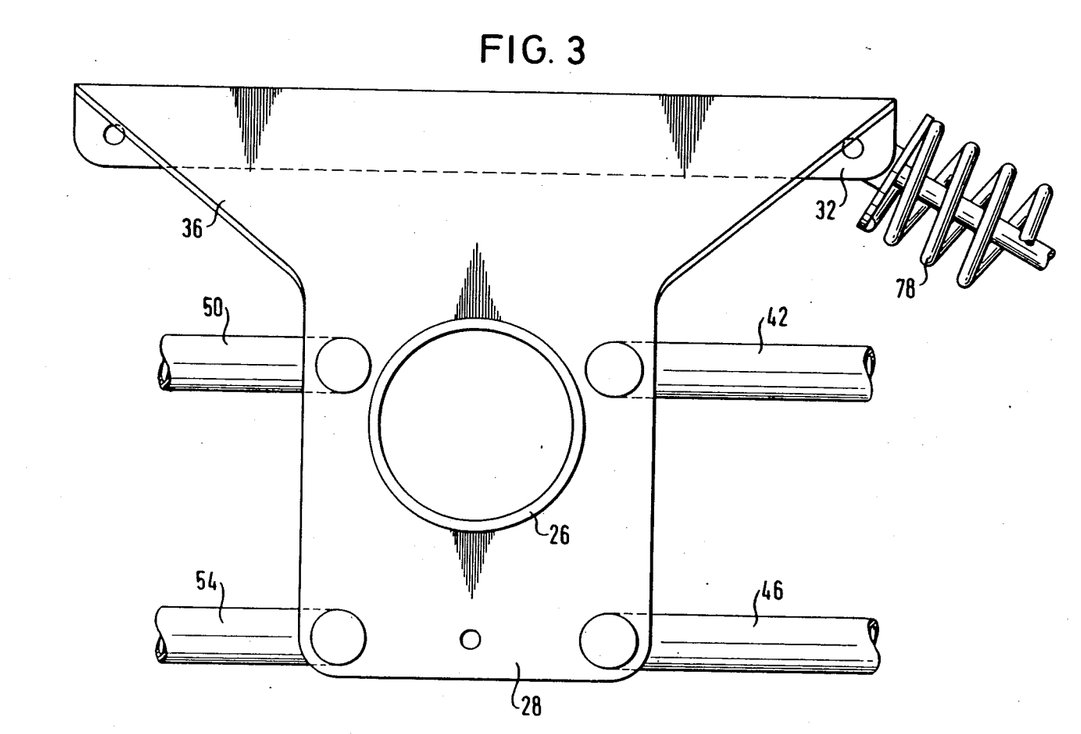
FIG. 3 is a partial view of the center frame of a running gear.

FIG. 3 shows an enlarged partial view of a portion of one of the running gears. Cross struts 42, 46, 50, 54 are pivotably mounted on the plate 28 (FIG. 2) which is fastened to one end of the tubular section 26 of a running gear. The plate is connected by means of an upwardly inclined, optionally unitary, further plate 36, to the upper cross strut 32 of the running gear. According to FIG. 3, springs 78 are supported on the ends of the upper cross strut 32, with the outer ends of the springs supported on wheel supports 58, in a manner not shown, corresponding to the shock absorbers 74 according to FIG. 2.

Figure 4:
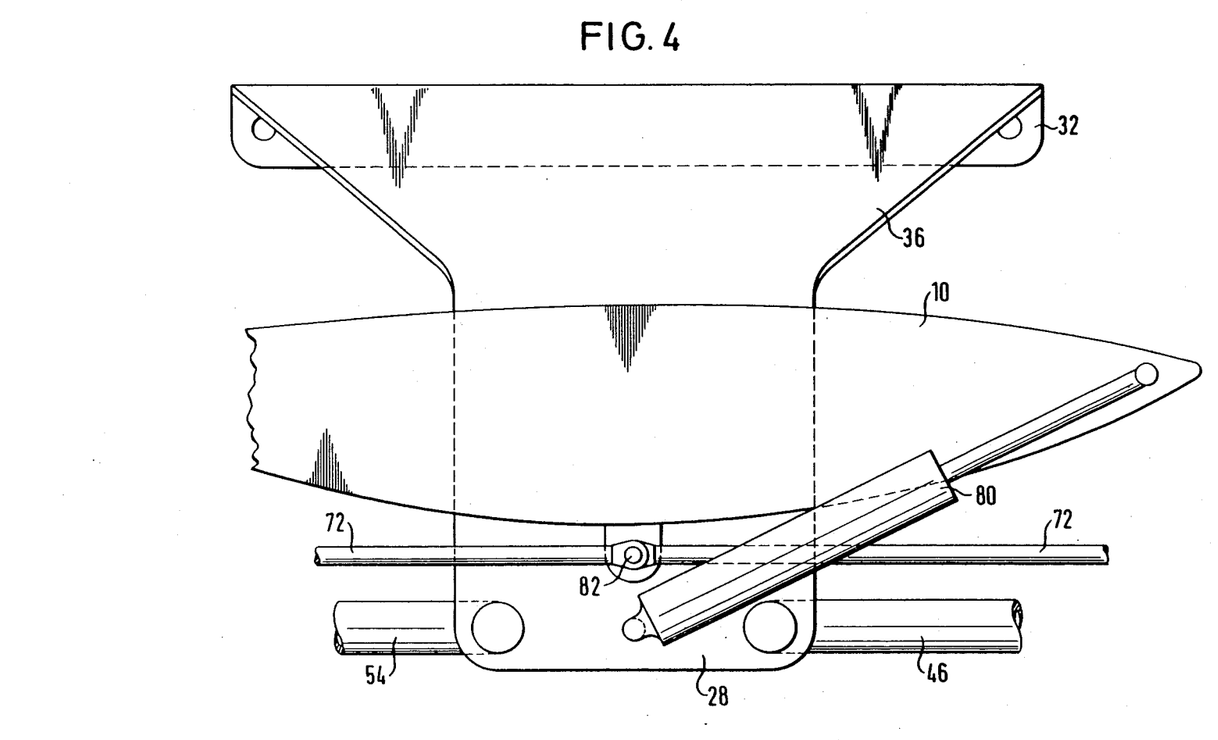
FIG. 4 is a corresponding view from another viewpoint.

FIG. 4 shows a similar view, but in combination with an indicated cross section of the board 10. According to FIG. 4, a shock absorber 80 is mounted on the lateral area of the board 10, with the other end of the shock absorber pivotably fastened to the lower area of the plate 28. The shock absorber 80 damps movements of the board 10 around its longitudinal center axis.

A shoulder 82 projects from the bottom of the board 10, or from the tubular section 38, 40 not shown here, to which the steering rods previously mentioned in connection with FIG. 2 are pivotably fastened. Lateral tilting movements of the board 10 around its longitudinal center axis are therefore transferred to the steering linkage and lead to the steering of the wheels. The steering linkage is laid out in detail so that the front and rear wheels are turned oppositely in order to steer the vehicle in the same direction, i.e. in the direction of a right turn or a left turn.

Figure 5:
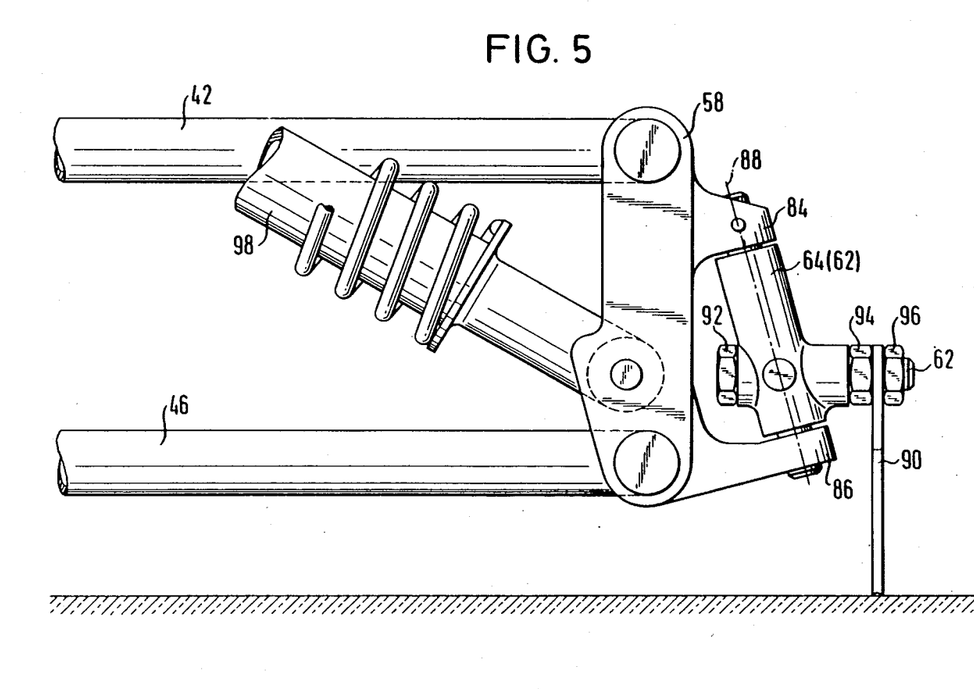
FIG. 5 shows details of the wheel or skid suspension from a running gear.

FIG. 5 shows details of a wheel support 58 at the outer ends of the triangle or transverse links 62, 64. On the outer side of the wheel support 58 the steering axle carrier 64 is pivotably supported in upper and lower bearings 84, 86. The pivot axis 88 is directed diagonally downwardly and outwardly, so that when wheels 66, 68 are used, always a very small steering roll radius is obtained, and impacts transmitted by the road to the wheels do not reach the board 10.

In the case of FIG. 5, a skid 90 is mounted by means of the nuts 92, 94, 96, on the axle 62 in place of the wheels shown in FIG. 2, so that the land vehicle according to the invention can be used as an ice boat.

In place of the shock absorbers 74, 76 shown in FIG. 2 and the springs 78 indicated in FIG. 3, in FIG. 5 a combined shock absorbing leg 98 with a spring and a shock absorber is shown.

It is additionally possible to improve the driving characteristics and the steerability of the aforedescribed land vehicle by the following measure.

If in the case of the running gears 20, 22 the pivot radii of the upper and lower transverse links are chosen to be different, then the wheel supports 60 are pivoted slightly around their center axes extending parallel to the longitudinal direction of the vehicle during the in and out spring deflection of the running gear. By shortening the pivot radii of the lower transverse links 46, 48, 54, 56 the contact points of the wheels 66, 68 may be caused to move during in and out deflection along a straight line with respect to the frame 24. This has the advantage that upon deflection no change in the track width arises.

The board 10, which according to FIG. 4 is connected by means of the shock absorbers 80 with the running gears, is advantageously additionally connected with both running gears by elastic elements, for example torsion bars or annular spring elements, so that the board 10 is held elastically in its equilibrium position with regard to rotation around the longitudinal center axis, in which the steering linkage is set to travel straight ahead. Therefore, if following a turn the driver brings the center of gravity of his body into a position over the longitudinal center axis of the board 10, the board automatically returns to its equilibrium position. The standing safety of the driver and the stability of sterring are thereby enhanced.

Figure 6:
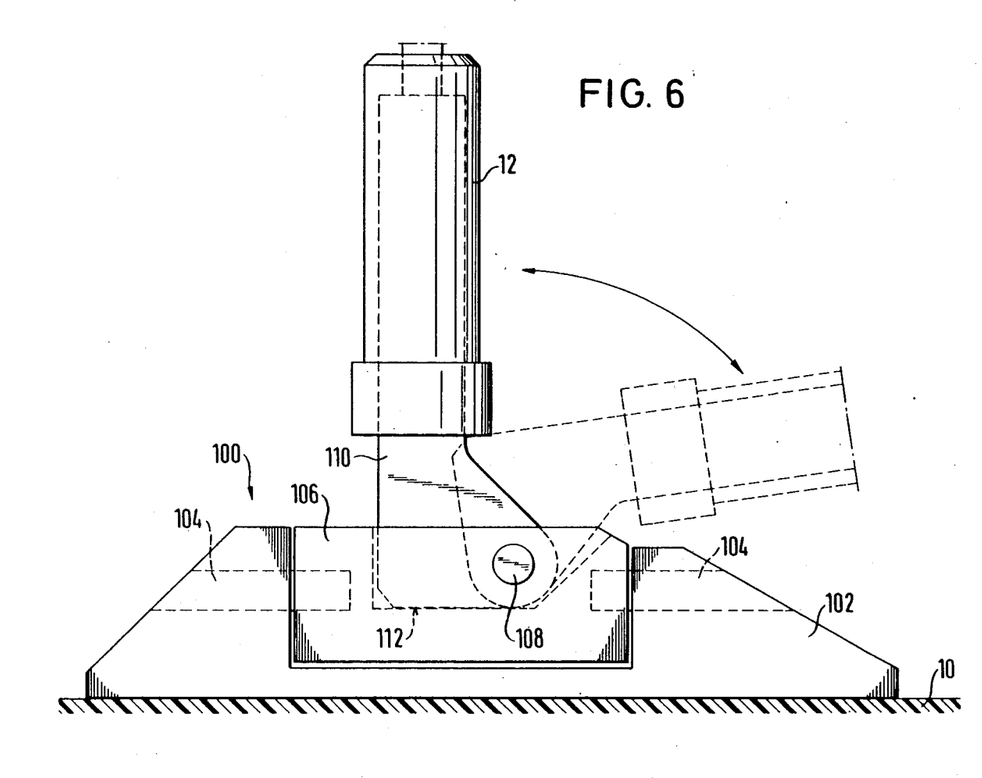
FIG. 6 is a side view of a mast base linkage.

FIG. 6 shows a mast base linkage 100, which serves to pivotably fasten the mast 12 to the board 10 and also through its special configuration contributes to increasing driving safety. The mast base linkage 100 comprises a socket 102 fastened to the board 10, with a hinge bolt 104 extending in the longitudinal direction of the vehicle, a hinged body 106 mounted on the hinge bolt 104 pivotably through 180#, with hinge bolts 108 extending in the transverse direction of the vehicle, and a mast holder 110 pivotable around hinge bolts 108, for rotatably mounting the mast 12. The mast holder 110 has a support surface 112 resting against the hinged body 106, when the mast 12 is extended at right angles to hinge bolt 104. The support surface 112 is located in front of the hinge bolts 108 as viewed in the direction of travel, so that the mast holder may only tilt backwards in the longitudinal direction of the vehicle, as indicated by broken lines in FIG. 4. Any forward tilting motion of the mast is thus prevented or at least restricted to a small angle. This has the advantage that the pressure of the sail is converted by the mast base linkage which is rigid in the forward direction, into propulsive force without the driver having to hold back the sail pressure with his body strength. This makes it easier for the driver to control the inclination of the mast in the transverse direction of the vehicle and to steer the vehicle by tilting the board 10 around its longitudinal axis by the shifting of his body weight. A further advantage of the mast base linkage 100 which is rigid in the forward direction is that in case of a fall of the driver, the forward tilting of the mast is prevented, so that any danger due to the top of the mast protruding in the direction of travel is avoided.

Figure 7:
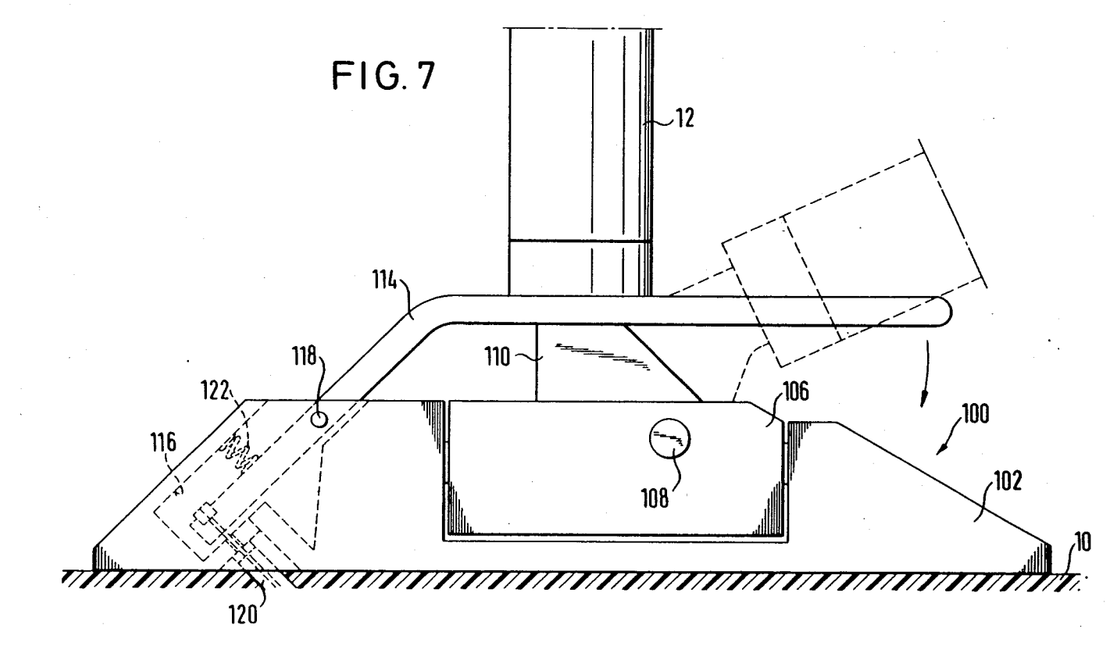
FIG. 7 shows a modified embodiment of the mast base linkage with a brake lever.

According to FIG. 7, a brake lever 114 is additionally arranged on the mast base linkage 100; it embraces the mast holder 110 fork-like from the front and is supported on the lower end of the mast. The brake lever 114 is pivotably fastened on a hinge bolt 118 in a recess 116 of the socket 102. Bowden cables 120 are anchored on the free end of the brake lever 114 directed away from the mast base 110, which lead to brakes integrated into the wheels of the land vehicle. If upon a fall of the driver the mast tips to the side or rearwardly, then the brake lever 114 is actuated by the lower end of the mast so that the brakes are tightened by the Bowden cables 120 and the vehicle is halted. The brake lever is prestressed with respect to the lower end of the mast by a return spring 122, so that the brakes are released during travel with an upright mast.

Figure 8:
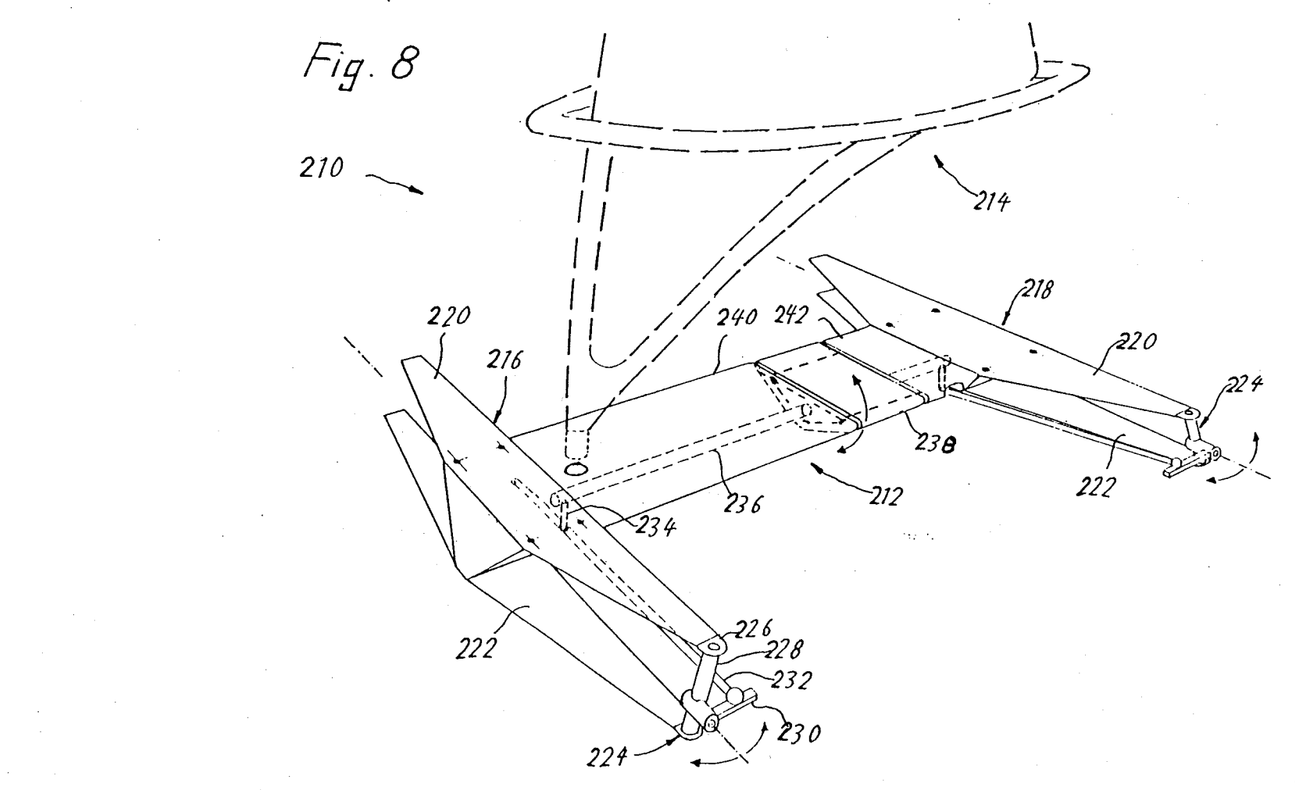
FIG. 8 shows a perspective view of the significant components of a vehicle constructed in accordance with another preferred embodiment of the invention.

A vehicle 210 corresponding to another preferred embodiment of the invention is illustrated in FIG. 8. The vehicle 210 comprises a standing board 212 on which a sail 214 can be mounted. Front and rear running gears 216 and 218, respectively, are each formed by two parallel flat spring bars 220 and 222, which extend perpendicularly in spaced relation to each other and which are rigidly attached to the front and rear portions, respectively, of the standing board, for example, by means of screws. The free ends of the spring bars 220 and 222 are each connected to each other by a wheel support 224 for a wheel (not shown). The spring bars, which are elastically deformable in a vertical direction, thus simultaneously form the transverse links and the springs of the wheel suspension system. Each of the wheel supports 224 has upper and lower mounts or holders 226 which fixedly receive the ends of the spring bars 220 and 222, and in which an axle support shaft 228 pivotable about a substantially vertical axis is mounted.

The spring bars 220 and 222, produced of glass fiber reinforced synthetic resin material, have an approximately trapezoidal form outline in plan view and taper or narrow toward their free ends. The standing board 212 is constructed as a self supporting hollow body of fiber reinforced synthetic resin material and has a substantially V-form cross section. The effective spring length, i.e. projecting length, of the lower spring bar 222 is therefore greater than that of the upper spring bar 220.

On an arm 230 on each axle shaft support 228 a steering rod 232 is pivotably attached, which extends into the interior of the hollow standing board 212 and is connected there through a short lever to a steering shaft 236 extending longitudinally through the standing board. The steering shaft is in turn rigidly connected with the steering member section 238 which matches the cross sectional configuration of the standing board 212 and constitutes a relatively short central section of the standing board. Preferably the steering member is arranged rearwardly of the sail in the rear half of the board. The vehicle is steered in that the steering member 138 is tipped with the foot about the axis of the steering shaft 236 relative to the front and rear sections 240 and 242 of the standing board which are rigidly interconnected with each other, so that the wheels of the front and rear running gears are turned oppositely to each other.

In the foregoing description the construction of the vehicle frame and steering system was explained with reference to an example of a vehicle with wheels. However, the invention is also usable in vehicles provided with skids or runners. Optionally, the transverse steering arms 42 through 56 in the vehicle illustrated in FIGS. 1 through 7, in which the entire standing board is tipped about its longitudinal axis in order to steer it, could also be replaced by spring bars corresponding to those of the embodiment of FIG. 8.

What is claimed is:

1. A wind-driven land vehicle comprising a board serving as a stand for a vehicle rider, a sail mounted on the board, front and rear support members, and steering means for steering said support members, said sail being carried on a mast mounted on said board by a linkage which permits the mast to be tilted out of a vertical position, said vehicle further comprising a brake actuating mechanism actuatable by tilting of said mast, wherein said brake actuating mechanism comprises a lever arranged on the mast linkage actuated by lateral or rearward tipping of said mast.

2. A vehicle according to claim 1, wherein said support members comprise wheels.

3. A vehicle according to claim 1, wherein said support members comprise skids.

4. A vehicle according to claim 1, wherein said front and rear support members are mounted to said board by front and rear running gears, respectively, each running gear comprising upper and lower transverse links for holding each support member and bearing means for pivotably supporting said board.

5. A vehicle according to claim 1, wherein said sail is carried on a mast mounted on said board by a mast base linkage which comprises a body mounted on said board so as to be pivotably about a longitudinal axis and a mast holder mounted on said body so as to be pivotably about a transverse axis, said mast holder having a forward support surface thereon which engages a surface on said body when said mast is oriented substantially perpendicularly to said longitudinal axis, whereby said mast base linkage permits the mast to be tilted laterally or rearwardly out of a vertical position, but prevents the mast from tilting forwardly out of the vertical position.

6. A vehicle according to claim 4, wherein tubular sections aligned with the longitudinal center axis of the board protrude from the front and rear ends of the board and are rotatably received within tubular mounting sections in the front and rear running gears.

7. A vehicle according to claim 6, wherein each running gear comprises a rigid central frame surrounding one of said tubular mounting sections, and the transverse links of each running gear are pivotably mounted on said rigid central frame.

8. A vehicle according to claim 4, further comprising wheel support members pivotally mounted on the outer ends of said transverse links, and wherein said wheel support members each carry a pivotable steering stub axle mounted on said wheel support by a pivotable steering axle carrier, and said pivotable steering axle carriers are operatively connected with the steering means to pivot in response to tilting of said board.

9. A vehicle according to claim 8, further comprising springs mounted between said wheel support members and the rigid central frame of the associated running gear.

10. A vehicle according to claim 8, further comprising shock absorbers mounted between said wheel support members and the rigid central frame of the associated running gear.

11. A vehicle according to claim 4, wherein the pivot radii of the lower transverse links are smaller than the pivot radii of the upper transverse links so that the points of contact between the support members and an underlying surface during in and out deflection move along a straight line with respect to the associated running gear.

12. A vehicle according to claim 4, wherein said board is interconnected with at least one of said running gears by means of resilient members which oppose tilting of the board around its longitudinal axis out of an equilibrium position in which the steering means is positioned for straight ahead travel.

13. A wind-driven land vehicle comprising a board serving as a stand for a vehicle rider, a sail mounted on the board, front and rear support members mounted on front and rear running gears, respectively, and steering means for simultaneously and oppositely steering said front and rear support members, said board being rigidly mounted on said front and rear running gears and comprising a steering member arranged rearwardly of said sail in the rear half of the board which forms an intermediate portion of the stand for the vehicle rider and is pivotable about the longitudinal center axis of the board said front and rear support members being operatively connected to said steering means and said steering means being operatively connected with said steering member such that said steering means are operated by a tipping movement of said steering member about the longitudinal center axis of the board, wherein said board is a self-supporting hollow structure having a recess, said steering member is accommodated in said recess, and said steering means comprises a steering shaft which extends longitudinally through the interior of the board and is connected to the steering member.

14. A vehicle according to claim 13, wherein each running gear comprises upper and lower transverse links for holding each support member, at least one of said transverse links being formed by a flat, horizontally oriented spring bar which is rigidly connected to the vehicle body.

15. A vehicle according to claim 14, wherein the upper and lower transverse links are formed by spring bars which have different natural frequencies of oscillation.

16. A vehicle according to claim 15, wherein the length of the projecting oscillating portion of the upper spring bar is smaller than the length of the projecting oscillating portion of the lower spring bar.

17. A vehicle according to claim 13, wherein said support members comprise wheels.

18. A wind-driven land vehicle comprising a board serving as a stand for a vehicle rider, a sail mounted on the board, two front and two rear support members mounted on front and rear running gears, respectively, and steering means for simultaneously and oppositely steering said front and rrar support members, said board being rigidly mounted on said front and rear running gears and comprising a steering member which forms an intermediate portion of the stand for the vehicle rider and which is pivotable about the longitudinal center axis of the board said front and rear support members being operatively connected to said steering means and said steering means being operatively connected with said steering member such that said steering means are operated by a tipping movement of said steering member about the longitudinal center axis of the board, wherein each running gear comprises upper and lower transverse links for holding each support member, at least one of said transverse links being formed by a flat, horizontally oriented spring bar which is rigidly connected to the vehicle body, and the opposite transverse link, for holding the support members on opposite sides of the vehicle is integrally formed by a continuous spring bar.

19. A vehicle according to claim 13, wherein said spring bars are made from fiber-reinforced synthetic resin material.

20. A vehicle according to claim 13, wherein said spring bar is trapezoidal in plan view.

* * * * *